(12) United States Patent
Boekels et al.

(10) Patent No.: US 11,532,912 B2
(45) Date of Patent: Dec. 20, 2022

(54) METHOD FOR CHECKING PLUG CONNECTIONS

(71) Applicant: Bayerische Motoren Werke Aktiengesellschaft, Munich (DE)

(72) Inventors: Christian Boekels, Munich (DE); Thomas Maierhofer, Freising (DE); Fabian Schroeter, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 229 days.

(21) Appl. No.: 16/681,942

(22) Filed: Nov. 13, 2019

(65) Prior Publication Data

US 2020/0083644 A1 Mar. 12, 2020

Related U.S. Application Data

(63) Continuation of application No. PCT/EP2018/068184, filed on Jul. 5, 2018.

(30) Foreign Application Priority Data

Jul. 31, 2017 (DE) .................... 10 2017 213 147.0

(51) Int. Cl.
*H01R 13/641* (2006.01)
*G01L 5/00* (2006.01)
(Continued)

(52) U.S. Cl.
CPC .......... *H01R 13/641* (2013.01); *G01L 5/0038* (2013.01); *G01L 5/0095* (2013.01);
(Continued)

(58) Field of Classification Search
CPC ...... H01R 13/641; H01R 43/26; G06N 20/00; G06N 5/003; G06N 5/04; G01L 5/0038;
(Continued)

(56) References Cited

U.S. PATENT DOCUMENTS 6,092,059 A * 7/2000 Straforini ............. G06K 9/6292
706/10
6,519,575 B1 * 2/2003 Goebel .................. G06K 9/628
382/159
(Continued)

FOREIGN PATENT DOCUMENTS

CN 102666004 A 9/2012
CN 103079723 A 5/2013
(Continued)

OTHER PUBLICATIONS

B. D. Fulcher and N.S. Jones, "Highly Comparative Feature-Based Time-Series Classification", IEEE Transactions on Knowledge and Data Engineering, vol. 26, No. 12, Dec. 2014 (Year: 2014).*
(Continued)

*Primary Examiner* — Douglas Kay
(74) *Attorney, Agent, or Firm* — Crowell & Moring LLP

(57) ABSTRACT

A method checks a plug connection, in which a first plug part is connected to a second plug part. The method determines a force-time curve of a force applied by an assembler during an assembly process of a plug connection. In addition, the method determines characteristic values of a plurality of characteristics of the force-time curve. The method also classifies the plug connection by use of a machine-learned classifier on the basis of the characteristic values of the plurality of characteristics.

6 Claims, 2 Drawing Sheets

(51) Int. Cl.
  *G06N 5/04* (2006.01)
  *H01R 43/26* (2006.01)
  *G06N 20/00* (2019.01)
  *G06N 5/00* (2006.01)

(52) U.S. Cl.
  CPC .............. *G06N 5/003* (2013.01); *G06N 5/04* (2013.01); *G06N 20/00* (2019.01); *H01R 43/26* (2013.01)

(58) Field of Classification Search
  CPC ... G01L 5/0095; G06K 9/6242; G06K 9/6282
  See application file for complete search history.

(56) References Cited

U.S. PATENT DOCUMENTS

| | | | |
|---|---|---|---|
| 2003/0008507 A1* | 1/2003 | Bell | G01N 21/25 438/689 |
| 2007/0080816 A1* | 4/2007 | Haque | B60K 28/066 340/576 |
| 2008/0250832 A1 | 10/2008 | Sanchez-Brunete Alvarez | |
| 2012/0033863 A1* | 2/2012 | Wojton | A61B 5/441 382/128 |
| 2012/0271581 A1 | 10/2012 | Draht et al. | |
| 2013/0139370 A1* | 6/2013 | Bloecher | B21D 39/031 29/407.08 |
| 2013/0166256 A1* | 6/2013 | Wirx-Speetjens | B33Y 50/00 703/1 |
| 2014/0005831 A1 | 1/2014 | Naderer et al. | |
| 2017/0029051 A1 | 2/2017 | Berg | |
| 2018/0130271 A1* | 5/2018 | Ishikawa | G07C 5/008 |
| 2018/0263314 A1 | 9/2018 | Fraeulin et al. | |
| 2019/0300868 A1* | 10/2019 | Gilbert | C12N 15/11 |
| 2020/0083644 A1* | 3/2020 | Boekels | G01L 5/0038 |
| 2020/0245873 A1* | 8/2020 | Frank | G01J 5/0025 |

FOREIGN PATENT DOCUMENTS

| | | | | |
|---|---|---|---|---|
| CN | 103429400 A | | 12/2013 | |
| CN | 103577835 A | * | 2/2014 | |
| CN | 105573245 A | | 5/2016 | |
| CN | 106404433 A | | 2/2017 | |
| CN | 106839986 A | | 6/2017 | |
| DE | 196 50 925 A1 | | 6/1997 | |
| DE | 10 2009 050 200 B3 | | 3/2011 | |
| DE | 10 2010 027 195 A1 | | 1/2012 | |
| DE | 10 2011 006 679 A1 | | 9/2012 | |
| DE | 10 2015 010 042 A1 | | 2/2017 | |
| DE | 10 2016 213 536 A1 | | 1/2018 | |
| DE | 102016213536 A1 | * | 1/2018 | |
| EP | 0 902 509 A1 | | 3/1999 | |
| EP | 2 075 881 A1 | | 7/2009 | |
| JP | 2010-249623 A | | 11/2010 | |
| WO | WO-2006126292 A1 | * | 11/2006 | ............. G16B 25/00 |
| WO | WO 2016/070984 A1 | | 5/2016 | |

OTHER PUBLICATIONS

H. Deng and et al, "A time series forest for classification and feature extraction", Information Sciences 239 (2013) 142-153 (Year: 2013).*
International Search Report (PCT/ISA/210) issued in PCT Application No. PCT/EP2018/068184 dated Sep. 14, 2018 with English translation (seven pages).
German-language Written Opinion (PCT/ISA/237) issued in PCT Application No. PCT/EP2018/068184 dated Sep. 14, 2018 (five pages).
German-language Search Report issued in counterpart German Application No. 10 2017 213 147.0 dated Feb. 27, 2018 with partial English translation (11 pages).
English translation of Chinese Office Action issued in Chinese Application No. 201880033253.5 dated Jul. 3, 2020 (eight pages).

* cited by examiner

METHOD FOR CHECKING PLUG CONNECTIONS

CROSS REFERENCE TO RELATED APPLICATIONS

This application is a continuation of PCT International Application No. PCT/EP2018/068184, filed Jul. 5, 2018, which claims priority under 35 U.S.C. § 119 from German Patent Application No. 10 2017 213 147.0, filed Jul. 31, 2017, the entire disclosures of which are herein expressly incorporated by reference.

BACKGROUND AND SUMMARY OF THE INVENTION

The invention relates to a method and a corresponding device for checking plug connections.

During the assembly of products, e.g. during the assembly of vehicles, plug connections often have to be created manually by an assembler. In this case, the quality of a plug connection may be dependent on the assembler's action during the production of plug connections.

The present document addresses the technical problem of providing a method by which the quality of plug connections can be checked in a reliable manner.

The problem is solved by the independent claim. Advantageous embodiments are described inter alia in the dependent claims. It is pointed out that additional features of a patent claim dependent on an independent patent claim without the features of the independent patent claim or only in combination with a subset of the features of the independent patent claim can form a dedicated invention which is independent of the combination of all features of the independent patent claim and which can be made the subject of an independent claim, of a divisional application or of a subsequent application. This is applicable in the same way to technical teachings which are described in the description and which can form an invention independent of the features of the independent patent claims.

In accordance with one aspect, a method for checking a plug connection is described. In the plug connection, a first plug part (e.g. a plug or a plug connector) can be connected to a second plug part. In particular, the first plug part can be plugged into a hole in the second plug part. The plug connection can be produced by a (human) assembler in the context of an assembly process.

By way of example, a plug as first plug part can be inserted into a hole (e.g. into a hole in a bodywork part of a vehicle) in order to produce a plug connection. In this case, a specific type of a plug connection has specific requirements with regard to the first and second plug parts. In particular, a specific type of a plug connection can have a specific type of first and second plug parts. As a consequence thereof, the forces exerted by an assembler in the assembly process usually have typical values for a specific type of plug connection. The machine-learned classifier described in this document can be different for different types or kinds of plug connections. In other words, for different kinds of plug connections different classifiers can be used to check a plug connection of the respective kind.

The method comprises determining a force-time profile of a force applied by an assembler during an assembly process of a plug connection. A force sensor on a glove of the assembler can be used for this purpose. The force-time profile can thus indicate the force (as a function of time) applied by the assembler in order to produce the plug connection.

Moreover, the method comprises determining feature values of a plurality of features of the force-time profile. The different features can be used to describe the force-time profile in a compact manner. In this case, relatively few features (e.g. between 4 and 10 features) can be used to describe the force-time profile. Preferably, features can be used which have a relatively high relevance with regard to whether the plug connection corresponding to the force-time profile is correct (i.e. okay) or faulty (i.e. not okay). The features can be combined to form a feature vector. The value of a feature vector can thus be determined in order to describe the force-time profile of a plug connection in a compact manner.

The method furthermore comprises classifying the plug connection by means of a machine-learned classifier on the basis of the feature values of the plurality of features, i.e. on the basis of the determined value of the feature vector. In this case, the classifier can preferably comprise a random forest classifier.

In particular, the classifier can be configured to allocate a combination of feature values of the plurality of features (i.e. a value of the feature vector) either to a first class or a second class. In this case, the first class can indicate that a plug connection is correct. On the other hand, the second class can indicate that a plug connection is faulty. The classifier can thus be configured to divide the N-dimensional feature space of a feature vector into two different regions or classes (wherein N is the number of different features).

The classifier may have been learned in advance on the basis of a multiplicity of first test force-time profiles for a multiplicity of correct plug connections and on the basis of a multiplicity of second test force-time profiles for a multiplicity of faulty plug connections. In this case, the multiplicity of second test force-time profiles can comprise or cover a plurality of different fault types of faulty plug connections. In particular, all possible fault types can be covered in the multiplicity of second test force-time profiles. A reliable classifier can thus be provided.

The method described in this document makes it possible to check plug connections on the basis of the corresponding force-time profiles in a reliable and efficient manner. In particular, in this case, a reliable identification of correct or faulty plug connections can be made possible by taking account of a plurality of different features.

The plurality of features can comprise at least one feature regarding an engagement point of the force-time profile. For this purpose, the force-time profile or a time derivative of the force-time profile, i.e. a derivative profile, can be analyzed in order to detect an engagement point. In this case, an engagement point can be detected as a peak or a spike in the derivative profile. In particular, it is possible to determine that the force-time profile comprises an engagement point if the derivative profile has a peak or a spike or a value that reaches or exceeds a specific threshold value. On the other hand, it is possible to determine that the force-time profile has no engagement point.

It is possible to determine e.g. an (if appropriate binary) feature indicating whether or not an engagement point was detected in the force-time profile. Alternatively or supplementarily, it is possible to determine a feature indicating a position of the engagement point within the force-time profile. Alternatively or supplementarily, it is possible to determine a feature indicating a value of the force (e.g. normalized to a specific maximum value) at the engagement point. Taking account of at least one feature with regard to an engagement point enables correct and/or faulty plug connections to be identified particularly reliably.

As already set out above, in the context of the method, a time derivative of the force-time profile can be determined in order to determine a derivative profile. The feature value of at least one feature, in particular a feature regarding an engagement point, can then be determined in a precise manner on the basis of the derivative profile.

The method can comprise determining a plurality of principal components on the basis of a multiplicity of test force-time profiles for a multiplicity of correct plug connections. In this case, a principal component can indicate force values or force derivative values as a function of time. In this case, the plurality of principal components can be determined in such a way that two different principal components are in each case substantially statistically independent of one another. Furthermore, the plurality of principal components can be determined in such a way that a linear combination of the plurality of principal components approximates as well as possible the multiplicity of test force-time profiles or derivatives of the multiplicity of test force-time profiles on average in the sense of a predefined distance dimension (e.g. in the sense of a mean square distance).

The plurality of different principal components (e.g. 2, 3, 4, 5 or more principal components) can thus indicate in a compact manner how the force-time profile and respectively the derivative profile of a correct plug connection are typically established. It is then possible to check in an efficient manner whether or to what extent the force-time profile or the derivative profile of a new plug connection can be described by the same different principal components.

The feature value of at least one feature can thus be determined on the basis of the plurality of principal components. In particular, the plurality of features can comprise at least one feature indicating how the force-time profile or the derivative profile of the plug connection is composed of the plurality of principal components. By way of example, in the context of the method, it is possible to determine one or more weights for one or more different principal components as corresponding one or more features. The one or more weights can be determined in order to approximate the force-time profile or the derivative profile (as well as possible in the sense of a distance dimension) by a linear combination of the one or more principal components. Taking account of principal components (i.e. carrying out a principal component analysis) enables a particularly reliable classification of plug connections on the basis of force-time profiles.

The method can comprise carrying out a dynamic time normalization of the force-time profile and/or of the derivative profile in order to determine a normalized force-time profile and/or a normalized derivative profile. In other words, the force-time profiles and/or the derivative profiles can be normalized with respect to time in order to increase the comparability. The feature values of one or more features can then be determined on the basis of the normalized force-time profile and/or on the basis of the normalized derivative profile. In this regard, the accuracy and/or reliability of the checking of a plug connection can be increased further.

In accordance with a further aspect, a device is described which is configured to carry out the method described in this document.

In accordance with a further aspect, a software (SW) program is described. The SW program can be configured to be executed on a processor and thereby to carry out the method described in this document.

In accordance with a further aspect, a storage medium is described. The storage medium can comprise an SW program configured to be executed on a processor and thereby to carry out the method described in this document.

It should be noted that the methods, devices and systems described in this document can be used both by themselves and in combination with other methods, devices and systems described in this document. Furthermore, any aspects of the methods, devices and systems described in this document can be combined with one another in diverse ways. In particular, the features of the claims can be combined with one another in diverse ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
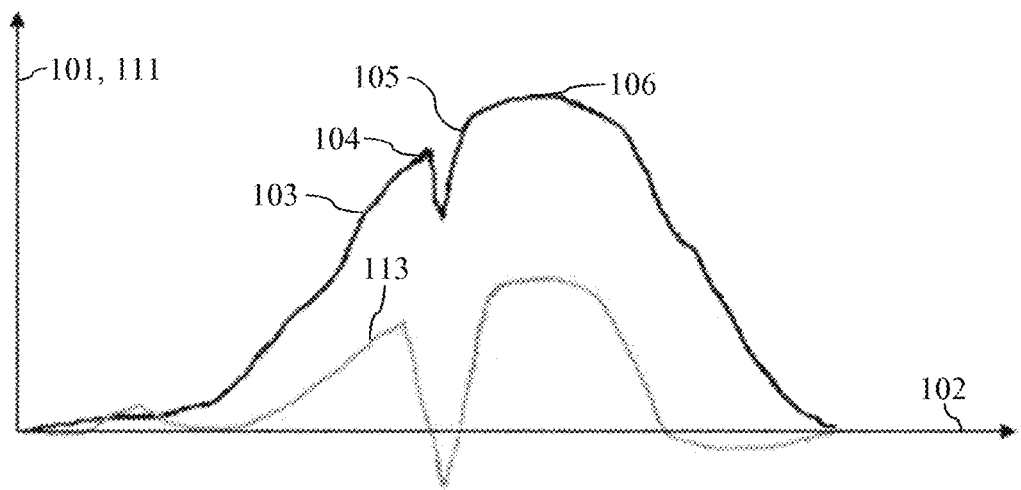
FIG. 1A shows an exemplary curve of the force applied by an assembler during the assembly of a plug connection as a function of time, and also a derivative of the force-time curve.

As set out in the introduction, the present document is concerned with the reliable and efficient checking of a plug connection.

In a plug connection, typically a first plug part (e.g. a pin, a bolt or a plug) is plugged into a second plug part (e.g. into a receptacle for a pin, a bolt or a plug). In this case, during the production of the plug connection, typically a resistance has to be overcome (e.g. for activating an engagement mechanism or click mechanism) in order to engage the plug connection.

For the purpose of monitoring the assembly of plug connections, the (compressive) force applied by an assembler as a function of time can be determined. For this purpose, e.g., during assembly the assembler can wear gloves having one or more pressure sensors (in particular on a thumb) which can detect the applied force during the assembly of a plug connection. Consequently, during the assembly of a plug connection, it is possible to determine a force-time profile 103 indicating the force 101 applied by an assembler as a function of time 102. Such a force-time profile 103 is illustrated by way of example in FIG. 1A. Furthermore, FIG. 1A illustrates a corresponding derivative profile 113 of the derivative 111 of the force 102 with respect to time 102 for the force-time profile 103.

As can be discerned from FIG. 1A, the force-time profile 103 of the assembly of a plug connection comprises different phases and different (local or global) force maxima. In a first phase, the force is built up as far as a joining force 104. In this first phase, the first plug part is typically inserted into the second plug part until an engagement mechanism is activated. This is typically followed by further insertion of the first plug part until an impact force 105 is reached, in the case of which the first plug part cannot be inserted further into the second plug part. Afterward, an assembler typically brings about subsequent pressing up to a subsequent-pressing force 106, followed by force reduction. A latching point or an engagement point can typically be determined on the basis of the force-time profile 103 between the joining force 104 and the impact force 105. In particular, on the basis of the force-time profile 103 and/or the derivative profile 113 between the joining force 104 and the impact force 105, it is possible to determine whether or not the force-time profile 103 has an engagement point.

The force-time profile 103 illustrated in FIG. 1A has proved to be typical of the assembly of a specific type of plug connections in a large number of investigations. In this case, for different types of plug connections (e.g. for plug connections having a different number of engagement mechanisms), different force-time profiles 103 result, but the latter typically have local force maxima corresponding to the joining force 104, the impact force 105 and the subsequent-pressing force 106.

From the (if appropriate averaged) force-time profile 103 of the assembly of a plug connection, it is possible to derive a model of an assembly procedure consisting of the following four phases: 1. force build-up, 2. joining, 3. subsequent pressing, 4. force reduction. In this case, it has been found, in particular, that typically the global maximum value of the force 101 in a force-time profile 103 does not correspond to the actual joining force 104 or the impact force 105, but rather to the subsequent-pressing force 106.

The joining force 104 typically indicates whether the first plug part (e.g. a plug) has been successfully pressed into the second plug part (e.g. an opening in a bodywork part). In this case, the joining force 104 is typically a characteristic value for the type of the plug connection, i.e. in particular for the type of the first plug part (e.g. the type of plug) used for a plug connection. The joining force 104 can have different magnitudes for different types of plug connections.

From the process monitoring and the determination of the force-time profiles 103, data thus arise which can be utilized in the context of predictive analytics in order to determine information regarding the quality of plug connections. The force-time profile 103 of an assembly procedure allows conclusions to be drawn about the tolerances and the constitution of a batch of first plug parts (e.g. of plugs). With the aid of machine learning methods, the force-time profile 103 of a specific assembly procedure can be compared with a typical force-time profile for the plug connection. In this regard, faulty productions (i.e. faulty plug connections) can already be detected and corrected at an early stage in an efficient and reliable manner.

For a specific type of plug connection (in particular for a specific type of the first plug part), it is possible to determine a reference joining force (e.g. by averaging a multiplicity of assembly procedures for plug connections of the specific type). The joining force 104 for a plug connection of the specific type can then be compared with the reference joining force in order to determine:

whether the plug connection has been correctly assembled or produced; and/or whether or not part of the plug connection (in particular the first plug part) has a defect; and/or whether an incorrect first plug part may have been used for a plug connection.

Furthermore, the subsequent-pressing force 106 (which typically represents the global maximum of a force-time profile 103) can be used to determine whether the plug connection has been correctly assembled or produced.

Figure 2:
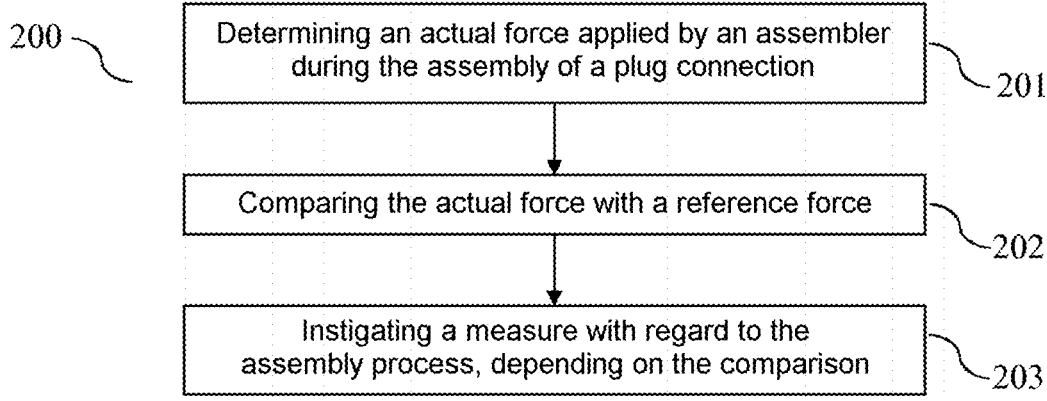
FIG. 2 is a flow diagram of one exemplary method for monitoring the assembly of a plug connection.

FIG. 2 shows a flow diagram of one exemplary method 200 for monitoring an assembly process of a plug connection in which a first plug part is connected to a second plug part. The method 200 comprises determining 201 an actual force 104, 106 applied by an assembler during an assembly process of a plug connection. For this purpose, a force-time profile 103 of the assembly process can be detected. Furthermore, the actual force 104, 106 can be determined as a local (and if appropriate global) maximum of the force-time profile 103. The actual force 104, 106 can correspond e.g. to the joining force 104 and/or the subsequent-pressing force 106. The actual force 104, 106 can be taken into account as a feature in the context of the method 300 described below.

The method 200 furthermore comprises comparing 202 the actual force 104, 106 with a reference force. In this case, the comparison can be effected in the context of a machine learning method, e.g. by employing a neural network and/or by employing a support vector machine.

Moreover, the method 200 comprises instigating 203 a measure with regard to the assembly process, depending on the comparison between the actual force 104, 106 and the reference force. In particular, a measure can be instigated if the actual force 104, 106 deviates from the reference force to an excessively great extent (e.g. upon a deviation threshold value being exceeded). In this regard, an assembly process can be monitored in a reliable manner by means of the method 200 (e.g. for quality assurance).

Figure 1B:
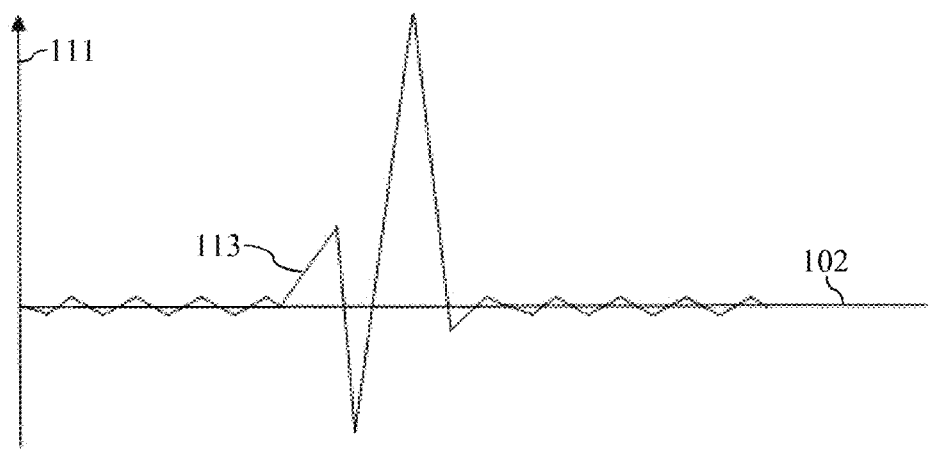
FIG. 1B shows an exemplary excerpt from the derivative of the force-time curve of a correct plug connection.
Figure 1C:
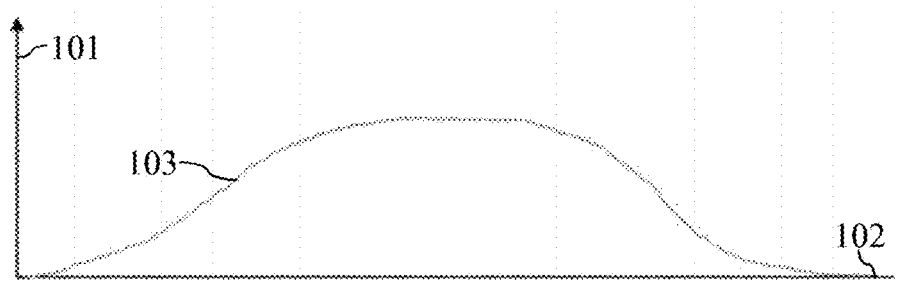
FIG. 1C shows an exemplary profile of the force-time curve of a faulty plug connection.

FIG. 1B shows the time profile 113 of the derivative 111 of the force 101 with respect to time 102. The derivative profile 113 indicates distinct excursions during the process of joining a plug connection and indicates a correct plug connection in the case illustrated in FIG. 1B. On the other hand, FIG. 1C shows the force-time profile 103 of a faulty plug connection.

This document describes a method which automatically identifies and evaluates the latching point or engagement point of components or plug parts in a force-time profile 103. If a first plug part has been latched correctly with a second plug part, typically in the derivative 111 (i.e. the gradient) of the force-time profile 103 it is possible to recognize a spike (see FIG. 1B) that is distinctly greater than the corresponding force drop in the force-time profile 103. This excursion in the derivative profile 113 indicates that the first plug part has engaged and is accordingly (with high probability) okay. If the derivative profile 113 lacks this spike, then the first plug part (with high probability) has not been properly installed and has not engaged.

In the context of the method described, it is possible to identify latching points or engagement points during the assembly of plug connections. It is then possible to decide whether a plug connection is OK (okay) or NOK (not okay). This classification can take place in a plurality of steps. In a first step, individual force-time profiles 103 for the assembly of individual plug connections can be identified from a time series of force measurement values. In other words, a multiplicity of force-time profiles 103 for a corresponding multiplicity of plug connections can be extracted on the basis of the force measurement values.

A latching point can then be detected for each plug connection (i.e. for each force-time profile 103). The latching point can correspond e.g. to a discontinuity or to a maximum of the force-time profile 103 and/or of the derivative profile 113. By way of example, the latching point can correspond to the point of the joining force 104. In this regard, for each plug connection it is possible to identify the position of the latching point on the respective force-time profile 103.

The respective plug connection can then be classified, taking account of the position of the latching point. In particular, for each plug connection it is possible to determine whether the plug connection is OK or NOK. Furthermore, the number or the proportion of OK plug connections can be determined. The number or the proportion of OK plug connections can then be compared with a desired number or with a desired proportion for a time segment. It is thus possible to check whether or not the required plug connections have engaged in a technically correct manner. Furthermore, the NOK plug connections can be identified and reworked, if appropriate.

A respective engagement point (if present) can thus be identified (in real time) for the individual force-time profiles 103 of the individual plug connections in a rule-based manner with the aid of the derivative 111 of the force 102. A plug connection can then be classified on the basis of the engagement point. In particular, it is possible to use information regarding an engagement point as a feature in the classification.

Even further relevant properties or features of a force-time profile 103 can be taken into account for the classification. In particular, the form of a force-time profile 103 can be analyzed with the aid of a functional principal component analysis. Furthermore, the position and/or the intensity of the derivative 111 of a force-time profile 103 can be taken into account. The different properties or features of a force-time profile 103 can be combined as dimensions of a feature vector, wherein the feature vector describes the force-time profile 103 and thus the plug connection.

The features can be classified with the aid of a machine learning algorithm (e.g. random forest). The similarity of a force-time profile 103 (determined e.g. by means of dynamic time warping) to force-time profiles 103 already measured can also be taken into account for the classification.

In this case, a supervised learning method can be used for the classification. Firstly, a training data set can be generated for each application (e.g. for a specific type of plug connection). In this case, the fact of whether the corresponding plug connection was OK or NOK is labelled for each force-time profile 103. From this training data set, the machine learning algorithm can learn to differentiate between OK and NOK. In particular, the feature space of a feature vector for describing force-time profiles 103 can thus be subdivided into two different regions, one region for OK and one region for NOK. Here for a high quality of the classification in the training data set all occurring cases of OK and NOK should be covered since otherwise types of fault that have not been trained may not (necessarily) be identified as such.

The fact of whether a plug connection is correct or faulty can thus be identified in an automated manner and in real time.

Figure 3:
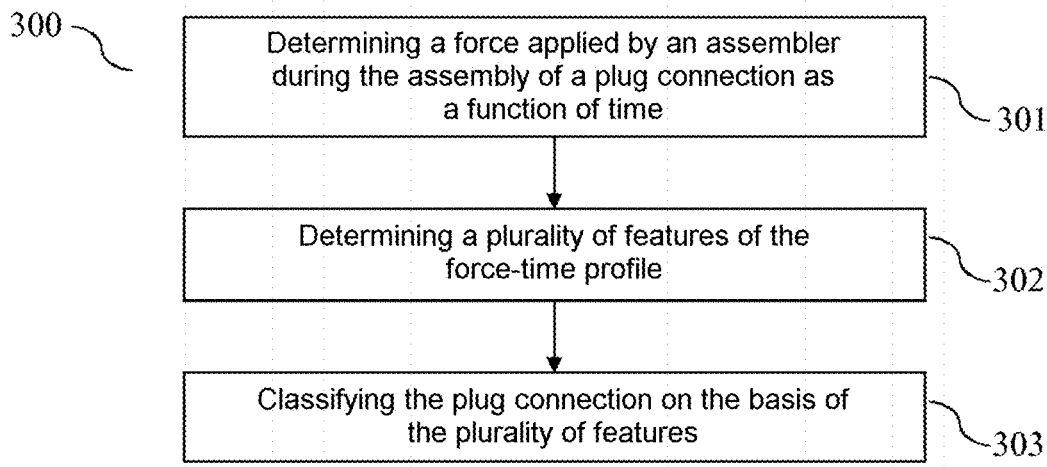
FIG. 3 is a flow diagram of one exemplary method for checking a plug connection.

FIG. 3 shows a flow diagram of one exemplary method 300 for checking a plug connection. In the plug connection, a first plug part is connected to a second plug part. The method 300 comprises determining 301 a force-time profile 103 of a force 101 applied by an assembler during an assembly process of a plug connection. For this purpose, e.g. by means of a pressure sensor on a thumb of the assembler, it is possible to measure the force 101 with which the assembler presses the first plug part into the second plug part in order to produce the plug connection.

Moreover, the method 300 comprises determining 302 feature values of a plurality of features of the force-time profile 103. The features can be different dimensions of a feature vector. The value of a feature vector can thus be determined on the basis of the force-time profile 103. Exemplary features are:
- a feature indicating whether or not an engagement point has been detected in the force-time profile 103;
- a feature indicating the force 101 (e.g. the joining force 104) at a detected engagement point; and/or
- at least one feature indicating a significant principal component of the force-time profile 103 or of the corresponding derivative profile 113.

The value of a feature vector which describes the force-time profile 103 can thus be determined.

The method 300 furthermore comprises classifying 303 the plug connection by means of a machine-learned classifier on the basis of the feature values of the plurality of features. In this case, the classifier can be configured to subdivide the value space spanned by the features into two or more different classes. In particular, the value space can be divided into exactly two classes, wherein a first class indicates that the plug connection is correct or okay and wherein a second class indicates that the plug connection is faulty or not okay. The classifier can comprise e.g. a random forest classifier.

The fact of whether a plug connection is OK or NOK can be determined in a reliable and efficient manner by means of the method 300 described in this document.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for checking a plug connection produced by a human assembler in an assembly process, the method comprising:
   inserting a plug as a first plug part into a hole in a bodywork Part of a motor vehicle as a second plug part by the human assembler in the assembly process to produce the plug connection;
   determining a force-time profile of a force applied by the human assembler during the assembly process of the plug connection, wherein a force sensor on a glove of the human assembler is used in determining the force-time profile;
   determining a plurality of features of the force-time profile;
   wherein the plurality of features comprise:
      at least one feature regarding an engagement point of the force-time profile;
      a feature indicating whether or not an engagement point was detected in the force-time profile;
      a feature indicating a position of the engagement point within the force-time profile; and
      a feature indicating a value of the force at the engagement point;
   combining the plurality of features to form a feature vector;
   determining a value of the feature vector which describes the force-time profile; and
   classifying the plug connection by way of a machine-learned classifier on a basis of the determined value of the feature vector, wherein the classifier comprises a random forest classifier, wherein the classifier was learned on a basis of a plurality of first test force-time profiles for a plurality of correct plug connections and on a basis of a plurality of second test force-time profiles for a plurality of faulty plug connections, and wherein the plurality of second test force-time profiles comprises a plurality of different fault types of faulty plug connections;

wherein the classifier allocates the determined value of the feature vector either to a first class or a second class, wherein the first class indicates that a plug connection is correct, and wherein the second class indicates that a plug connection is faulty.

2. The method according to claim 1, wherein the method further comprises:
determining a time derivative of the force-time profile in order to determine a derivative profile;
wherein a feature value of at least one feature is determined on a basis of the derivative profile.

3. The method according to claim 2, wherein the method further comprises:
determining, on a basis of a plurality of test force-time profiles for the plurality of correct plug connections, a plurality of principal components;
wherein the feature value of at least one feature is determined on a basis of the plurality of principal components.

4. The method according to claim 3, wherein
the plurality of features comprises at least one feature indicating how the force-time profile or a derivative of the force-time profile of the plug connection is composed of the plurality of principal components; and
the method further comprises determining one or more weights for one or more different principal components as corresponding one or more features in order to approximate the force-time profile or the derivative of the force-time profile by a linear combination of the one or more principal components.

5. The method according to claim 3, wherein
a principal component indicates force values or force derivative values as a function of time; and
the plurality of principal components is determined in such a way that:
two different principal components are in each case substantially statistically independent of one another; and
a linear combination of the plurality of principal components approximates as well as possible the plurality of test force-time profiles or derivatives of the plurality of test force-time profiles on average in a sense of a predefined distance dimension.

6. The method according to claim 1, wherein
the method comprises carrying out a dynamic time normalization of the force-time profile and/or a derivative of the force-time profile in order to determine a normalized force-time profile or a normalized derivative profile; and
the feature values of one or more features are determined on a basis of the normalized force-time profile and/or the normalized derivative profile.

* * * * *